Nov. 20, 1962   D. G. PITTWOOD   3,064,502
AUTOMATIC TOOL CHANGER
Filed Aug. 8, 1961   3 Sheets-Sheet 1
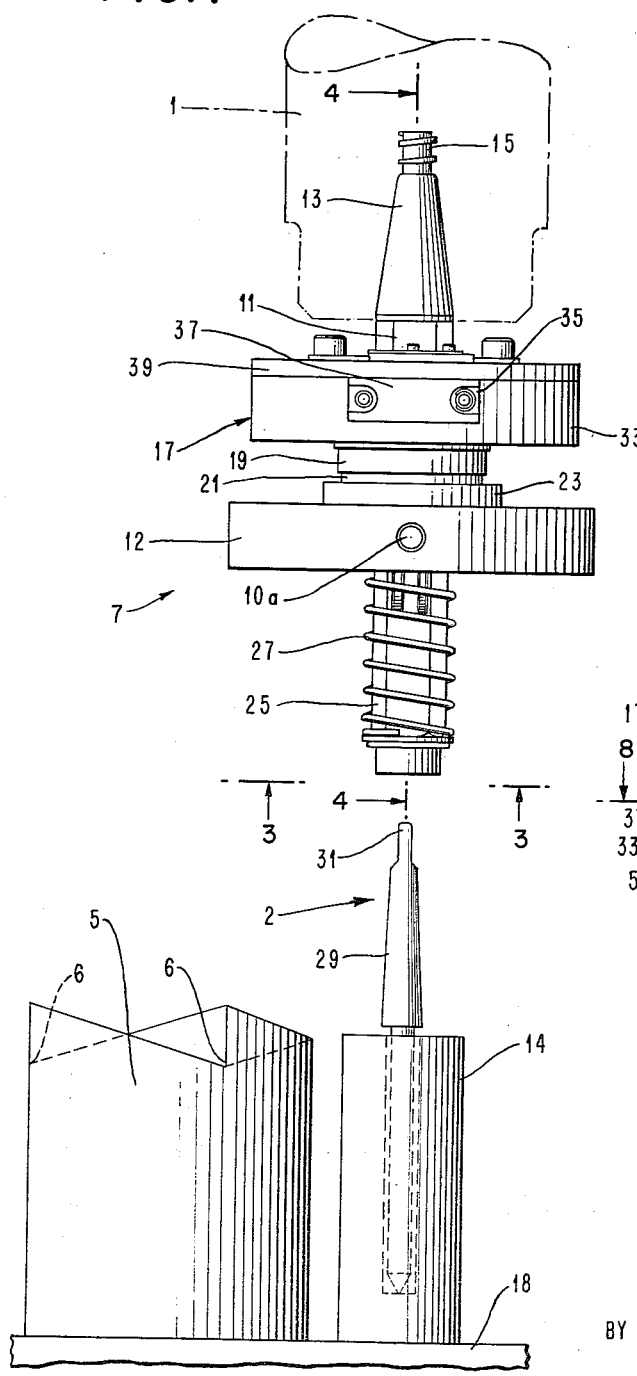
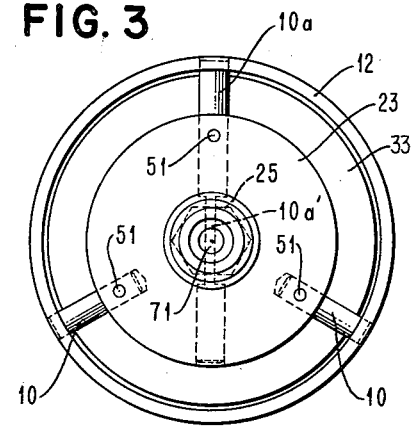
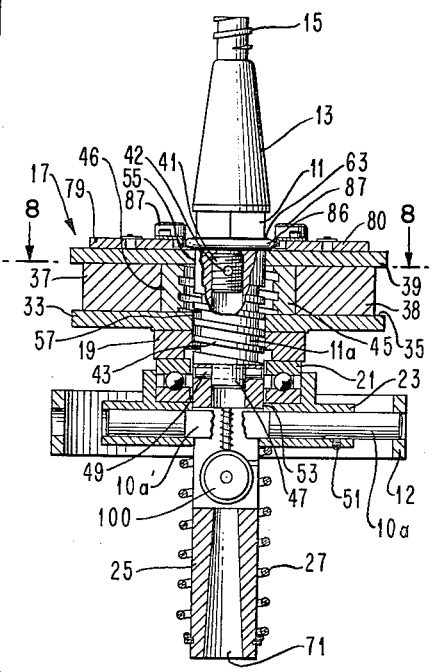
INVENTOR
DONALD G. PITTWOOD
BY Geoffrey Knight
ATTORNEY Nov. 20, 1962    D. G. PITTWOOD    3,064,502
AUTOMATIC TOOL CHANGER
Filed Aug. 8, 1961    3 Sheets-Sheet 2
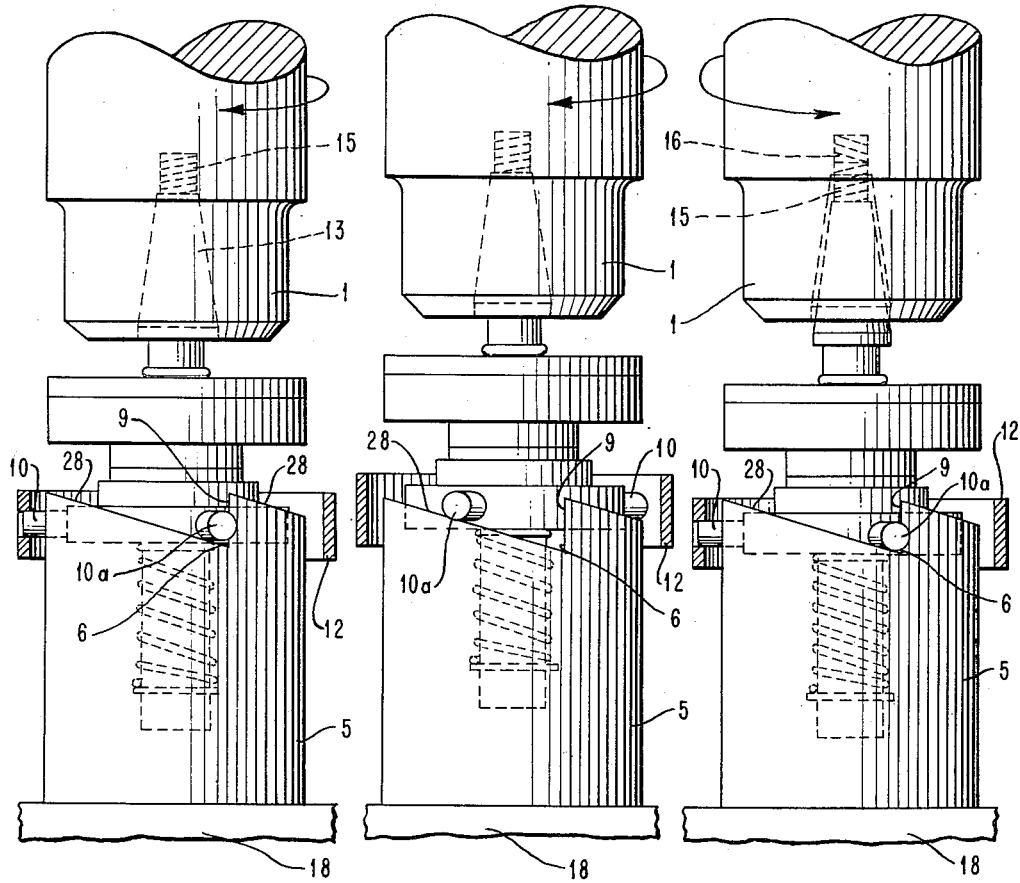
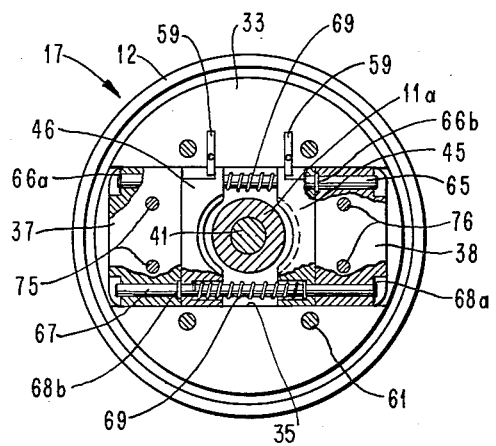
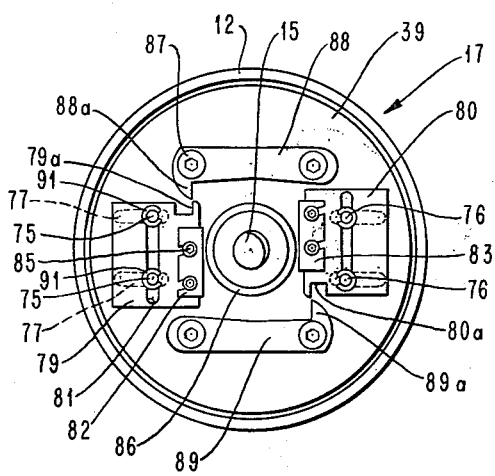

Nov. 20, 1962 D. G. PITTWOOD 3,064,502
AUTOMATIC TOOL CHANGER
Filed Aug. 8, 1961 3 Sheets-Sheet 3

United States Patent Office 3,064,502
Patented Nov. 20, 1962

3,064,502
AUTOMATIC TOOL CHANGER
Donald G. Pittwood, Endicott, N.Y., assignor to International Business Machines Corporation, New York, N.Y., a corporation of New York
Filed Aug. 8, 1961, Ser. No. 130,122
7 Claims. (Cl. 77—55)

This invention relates to automatic tool changing and, more particularly, to automatic tool changers for machines of the type having a rotatable tool holder or spindle.

Much of industry's basic machining is performed by machine tools of the type having a rotatable tool holder or spindle and a selectively positionable workpiece holder or table. In the automation of this type of machinery, systems have been developed which automatically control the speed and direction of spindle rotation (spindle speed control), the velocity and distance of spindle extension and retraction (spindle feed control), and the positioning of the worktable. However, such systems provide automation in only a limited sense since tools must be changed manually and, thus, each tool change necessitates an undesirable break in the automatic cycle of operation.

To eliminate these periodic interruptions of the automatic cycle, subsequent systems have been made to include an automatic tool changing capacity, as well as a capacity to control the basic spindle and worktable movements mentioned hereinbefore.

The first automatic tool changers called for the addition to the machine of two large and involved accessories: a storage rack and a tool transfer device. The tool storage rack is supported next to the machine tool on its own frame and comprises some type of movable table capable of holding a plurality of tools which may be indexed for tool selection. The rack also requires an independent control system for controlling the movement of the table to and from an operative position with the machine spindle to correctly position a selected tool in proximity with the machine spindle. This type of tool storage mechanism is, in fact, a separate machine in its own right and compounds the control problems incident to the operation of an automatic machine tool. The second required accessory, a tool transfer device, is adapted to cooperate with the movements of the tool storage rack. When a tool is moved into the area of the machine spindle by the movable table of the storage rack, the tool transfer device grasps the tool, removes it from its position on the storage table, and secures it in the machine spindle. When a tool is to be removed from the machine spindle and replaced on the storage table, the tool transfer device operates in the reverse sequence. Another independent control system is required to operate this tool transfer device. Also required is a central control unit to coordinate the operation of the two major accessories with the operation of the basic elements of the automatic tool (spindle speed, spindle feed, and worktable positioning).

Still another limitation of these systems is found in the need for special adaptive equipment to be coupled with each tool to be used in the machine; standard, unaltered tools cannot be used.

Later improvements in the field of automatic tool changing have considerably reduced the extra hardware and control apparatus requirement by eliminating the need for the separate tool storage rack and the intricate tool transfer device. These improvements include the tool storage rack as a part of the machine worktable and utilized the worktable control unit in a dual capacity so that the control unit manipulates both the workpiece and the storage rack. The tool transfer device is eliminated by utilizing a simple rotary coaction of the machine spindle, the tool, and the tool rack to perform the tool transfer function. Thus, this type of system provides completely automatic tool changing capacity to the machine tool, requires only a small fraction of the extra hardware required by past systems, and practically eliminates the need for any control apparatus otherwise unnecessary to the normal operation of an automatic machine tool of the rotating spindle type. However, it is still necessary to equip individual tools with special adapters and, as a result, the cost of tool maintenance, handling and storage remains high.

It is, therefore, an object of my invention to provide an improved automatic tool changer for a machine tool of the type having a rotatable spindle, which tool changer overcomes the limitations mentioned above.

Other more particular objects of my invention include the following:

For a machine tool having a rotatable spindle, provision of an improved automatic tool changer which handles standard tools and which is entirely controlled by the standard control apparatus included on a machine tool of the rotating spindle type for normal automatic operation thereof;

Provision of an improved automatic tool changer that may be used on a standard machine tool of the rotating spindle type, which use requires a minimum amount of modification to the machine tool;

Provision of automatic tool changing capacity to a machine tool having a rotating spindle without need of equipping individual tools (to be used with a machine tool) with special adapting apparatus;

In a machine tool having a rotatable spindle and automatic tool changing capacity, elimination of separately controlled machine accessories without requiring adaptive apparatus for individual tools.

In accordance with the present invention, means are provided for adapting a machine spindle to automatically receive and eject standard tools. What is more, the adapting means may itself be automatically inserted in, and removed from, the machine spindle. In the present invention, an inertia device responds to both centrifugal force of rotation of the machine spindle and to changes in the rate of rotation thereof to automatically perform the tool changing operation.

The present invention operates with standard tools and requires no modification or special adaptation thereof. Standard machine tools of the rotating spindle type may be readily and easily adapted to utilize the present invention. Further, the present invention permits control of the complete tool changing operation through manipulation of only the spindle and worktable of the machine and does not require controls otherwise unnecessary to the normal automatic operation of the machine. The present invention is simple and compact and eliminates the need for extensive, independently controlled separate machines which act in an auxiliary capacity to assist the machine tool in performing the automatic tool changing operation.

The foregoing and other objects, features and advantages of the invention will be apparent from the following more particular description of a preferred embodiment of the invention, as illustrated in the accompanying drawings.

In the drawings:

FIG. 1 is a front elevation of a tool changer embodying the present invention showing its relation to a machine spindle and to a stored tool.

FIGS. 2a–2c are front elevations (partially sectioned) of the tool changer shown in FIG. 1 and illustrate its relation to the machine spindle and a tool changer cradle during three stages of the automatic operation which couples and uncouples the tool changer and the spindle.

FIG. 3 is a bottom plan view of the tool changer of the preferred embodiment, taken along line 3—3 in FIG. 1.

FIG. 4 is a sectional view taken generally along the line 4—4 in FIG. 1.

FIG. 6b is a sectional view taken generally along line 6b—6b of FIG. 6a.

FIG. 8 is a sectional view taken along the line 8—8 of FIG. 4.

FIG. 9 is a top plan view of the device shown in FIG. 4.

Figure 5:
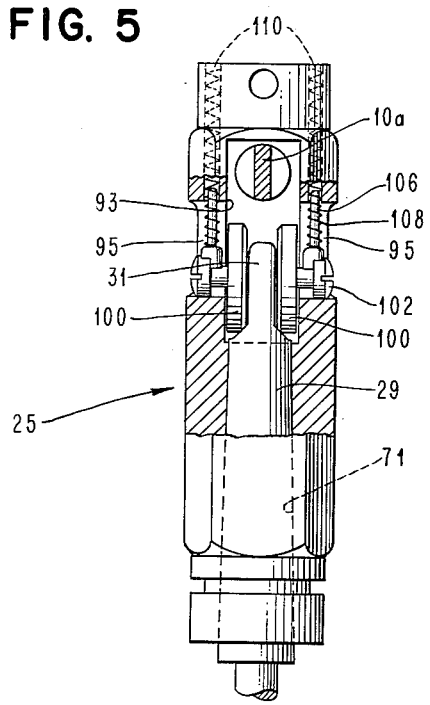
FIG. 5 is a partially sectioned front elevation of a socket portion of the tool changer of FIG. 1 showing tang-orienting mechanism details.

A general description of a preferred embodiment of the present invention will now be made with general reference to FIG. 1.

FIG. 1 shows a preferred embodiment of the present invention including a tool changer 7 positioned in operating relationship with respect to a machine spindle 1. Machine spindle 1 is rotatable in either direction and may be raised and lowered by the appropriate control mechanisms (not shown) included on a machine tool, which may be of the vertical boring machine type. A system for automatically controlling such movements of a vertical boring machine by the use of information stored in punched data cards is disclosed in Patent 2,901,927 to Morgan.

Machine worktable 18 may be indexed to coordinates points in a horizontal plane in response to either manual or automatic control. A system for automatically indexing a worktable is disclosed in the Morgan patent. Worktable 18 may support one or more tool racks 14 and one or more tool changer cradles 5, in addition to a workpiece (not shown).

Figure 10:
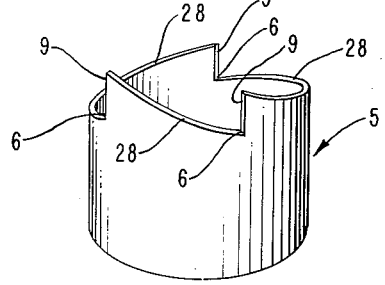
FIG. 10 is a perspective view of a tool changer cradle.

Cradle 5 (shown in perspective in FIG. 10) is a holder wherein tool changer 7 may be stored when not in use in the machine spindle. When the tool changer is being stored in cradle 5, pins 10 and 10a, more clearly shown in FIG. 3, rest in three notches 6 of the cradle. Means are provided for automatically coupling and uncoupling tool changer 7 with machine spindle 1 through a coaction of cradle 5, pins 10 and 10a and the machine spindle. These same means are completely shown and described in my copending application, Serial No. 783,942, filed December 30, 1958, now Patent No. 3,028,770, dated April 10, 1962, where they are used for coupling and uncoupling a passive tool holding mechanism with a machine spindle.

A preferred embodiment of the tool changer, 7 of FIG. 1, comprises a center shaft 11 having on its upper end a taper 13 and a set of threads 15. On the lower end of shaft 11 is attached a socket 25, which is adapted to cooperate with a shank 29 and a tang 31 of a tool 2 which is stored in tool rack 14. A novel tang-orienting mechanism (FIG. 5), to be described in detail later, is mounted within socket 25 and acts upon tang 31 of tool 2 so that the tool is oriented to seat properly in socket 25 during the tool pickup operation.

Rotatably mounted about shaft 11 is a control mechanism 17, to be described in detail later. Generally, however, control device 17 (FIG. 4) comprises a circular body portion 33 having a radial groove 35, two weight members 37 and 38, and a circular cover plate 39. A tool disengaging device 23 is slidably mounted about an upper portion of socket 25 and has about its circumference two pins 10 and a pin 10a (FIG. 3), which are secured to disengaging device 23 by three set screws 51. A safety ring 12, more clearly shown in FIG. 3, encompasses pins 10 and 10a and prevents them from being a source of danger to operating personnel as the tool changer rotates at a high speed. Control device 17 and tool disengaging device 23 are spaced apart from one another on shaft 11 by a spacer ring 19 and a thrust bearing 21. A spring 27 biases the entire slidable assembly comprising disengaging device 23, thrust bearing 21, spacer ring 19 and control device 17 in an upward direction against a collar (63 of FIG. 4) on shaft 11. Mounted on cover plate 39 is a detent mechanism (FIG. 9) comprising a pair of hooks 88 and 89 and a pair slidable latches 79 and 80. As will be explained in the subsequent more detailed description, this mechanism provides for selective operation of control device 17 in order to prevent actuation thereof under certain conditions.

Once the tool changer has been secured in the spindle of the machine, a selected tool is positioned beneath it by appropriate movement of workable 18 in preparation for the initial tool pickup operation. The machine spindle 1 is then lowered without rotation and socket 25 couples with the upwardly projecting tapered shank 29 and tang 31 of the tool. As socket 25 closes about the shank and tang, the tang-orienting mechanism in the socket contacts the tang of the tool and orients it to a correct position for positive seating in the socket 25. The wedging force created between the tapered shank 29 of the tool and a tapered recess, 71 of FIG. 4, within socket 25 is sufficient to hold the tool in the socket as the machine spindle is raised in order to draw the tool out of the rack 14 and permit the positioning of a workpiece beneath the tool.

After a tool has performed its operation or operations upon the workpiece, ejection and replacement of the tool in its designated storage rack is effected to complete the tool changing cycle. As the machine spindle is brought to a stop, the proper storage rack is positioned beneath the tool and the tool is partially lowered into it. The machine spindle is then angularly accelerated in a direction of rotation opposite to that used in the machining operation and is abruptly stopped in order to trip a tool ejection mechanism in control device 17. In accordance with the present invention, the tool ejection mechanism, to be described in detail later, forces tool disengaging mechanism 23 against the bias of spring 27. This sharp downward movement causes a flat portion 10a' (FIG. 3) of pin 10a in disengaging member 23 to come into contact with tank 31 of the tool with sufficient force to dislodge the tool from socket 25. The tool falls from the tool changer into its proper location in the rack 14, thus completing the tool changing cycle. Spring 27 restores the slidable assembly comprising disengaging device 23, thrust bearing 21, spacer ring 19, and control device 17 to its normal upper position and the tool changer is ready to proceed with the selection of the next tool and to handle it in the above described manner to continue the machining process.

*Automatically Coupling and Uncoupling the Tool Changer To and From the Machine Spindle*

A method of automatically coupling and uncoupling the preferred embodiment of the present invention with and from the machine spindle is hereinafter described with reference to FIGS. 2a, 2b, and 2c. The cradle 5 for the tool changer is mounted on worktable 18 as shown in FIG. 2a. The cradle 5 (shown in perspective in FIG. 10) comprises an annular body having three equal "teeth" at its upper end. Each tooth includes a vertical shoulder 9 and a sloped portion 28. When the tool changer resides in cradle 5, pins 10 and 10a rest in the notches 6. To couple the tool changer to the machine spindle, the cradle 5 is first brought into vertical alignment with the spindle by movement of worktable 18. The spindle is then lowered, as shown in FIG. 2a, while it is rotating in a clockwise direction (hereinafter all such references assume the observer to be looking from the top of the device) so that the threads 15 on the upper end of the tool changer are screwed into a corresponding set of threads (16 of FIG. 2c) in the machine spindle. The tool changer does not rotate in the cradle 5 during this operation because the torque transmitted to the pins 10 and 10a is insufficient to force them up the slopes 28. However, after the tool changer is threaded into the machine spindle, continued spindle rotation causes the pins 10 and 10a to ride up the slopes 28, as shown in FIG. 2b, thereby forcing spindle 1 upward against the action of its downward feed. This upward forcing of the spindle is detected by a control switch (not shown) and the direction of spindle feed is reversed to draw the tool changer up out of cradle 5 (as described in my copending application Serial Number 783,942).

To take the tool changer out of the machine spindle, the latter is lowered (after being vertically aligned with an empty cradle 5) while being rotated in the counterclockwise direction (FIG. 2c) until the pins 10 and 10a butt up against vertical shoulders 9 of cradle 5. Shoulders 9 immediately stop the rotation of the tool changer and the threads 16 of the machine spindle begin to unscrew from the threads 15 of the tool changer. As the pins 10 and 10a come to rest in the notches 6 of the cradle 5, the machine spindle is forced upward against its downward feed by the action of threads 16 on threads 15. This forced upward movement of the machine spindle is detected by a control switch (not shown) and the spindle feed direction is reversed thereby. This draws the spindle away from the tool changer and frees the former to perform other operations. Complete disclosure of the means for automatically controlling the above-mentioned spindle movements is made in my copending application, Serial Number 783,942.

To more clearly understand the interrelation of the several parts of the preferred tool changer, reference may be had to FIG. 4, which is a side elevation sectional view taken generally along the lines 4—4 of FIG. 1. A center shaft portion provides positive torque transmission from the machine spindle to a tool held in recess 71 of socket member 25. The center shaft comprises shaft 11 having on one end taper 13 and threads 15 and having on the other end a threaded member 41, a shaft extension 11a having a set of left-hand threads 43 about its outer surface, and hexagonal socket portion 25. Shaft extension 11a is positively connected to shaft 11 by means of threaded member 41 and a pin 42, while socket member 25 is positively connected to shaft extension 11a by a stud 47 and a pin 49. The assembly comprising control device 17, spacer ring 19, thrust bearing 21 and tool disengaging member 23 is mounted about the rigid center shaft and is adapted to slide axially with respect thereto. Control device 17, spacer ring 19 and the upper race of thrust bearing 21 are adapted to rotate about the center shaft, as well as to slide axially in respect thereto, as previously mentioned. Disengaging member 23 is fitted about hexagonal socket member 25 by means of a hexagonal opening at 53 and, thus, is angularly rigid with respect to the center shaft. The entire movable assembly comprising control device 17, spacer ring 19, thrust bearing 21 and disengaging member 23 is normally biased upward against shaft collar 63 by spring 27.

Tang-Orienting Mechanism

Figure 6B:
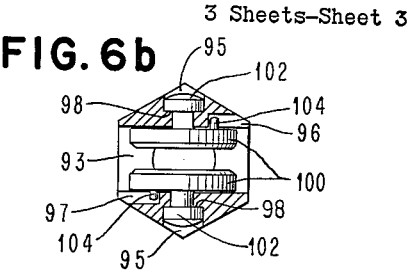
Figure 6A:
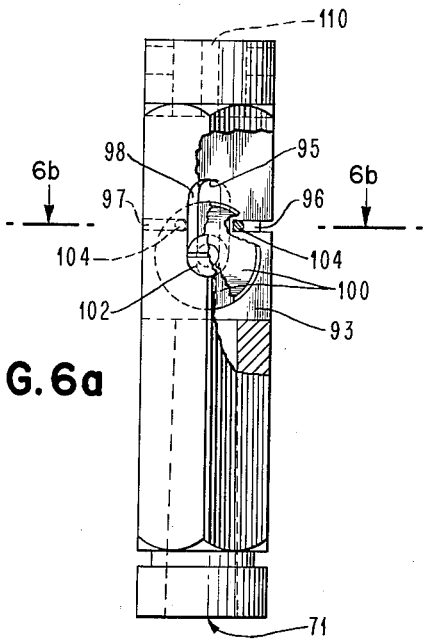
FIG. 6a is a partially sectioned side elevation of the socket portion shown in FIG. 5.

In order to provide the tool changer of the present invention with a capacity to automatically pick up standard tapered-shank tools, a novel tang-orienting mechanism is provided in socket member 25. This tang-orienting mechanism can best be understood with reference to FIGS. 5, 6a, 6b, 7a and 7b. The lower portion of hexagonal socket shaft 25 has in it a tapered recess 71 machined so as to fit the standard taper of the shank 29 of a tool. A rectangular slot 93 extends through the upper portion of socket shaft 25. When the shank 29 is seated in recess 71, tang 31 extends into slot 93. Two vertical oblong slots 95 extend through the walls of the socket shaft and join with slot 93 at right angles. The slots 95 are stepped and each has an internal shoulder 98 approximately midway between the outer surface of the socket shaft 25 and the slot 93. Machined into two opposing inner walls of the slot 93 are two horizontal camming grooves 96 and 97, shown in FIGS. 6a and 6b. A pair of tang-orienting wheels 100 are slidably mounted within slot 93 by two screws 102. The heads of screws 102 ride on the internal shoulders 98 of the slots 95. Vertical movement of the screws 102 within the slot 95 is biased by the action of two springs 108 (FIG. 5), which are guided by two guide pins 106 and two vertical holes 110. Each wheel 100 has attached to it a camming stud 104. The studs 104 are adapted to mate with camming grooves 96 and 97. The opposed inner faces of the wheels 100 provide mating surfaces for the flats of the tang 31 of the tool, whereby the tool may be held in positive interlock with the socket member 25, restrained from angular motion relative thereto.

Figure 7A:
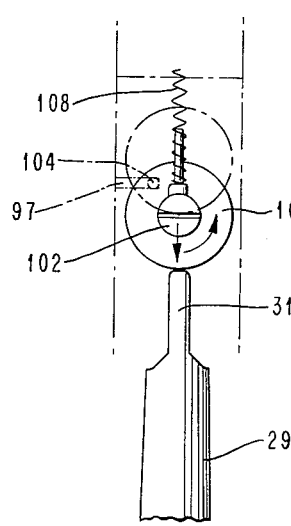
FIGS. 7a and 7b are right-angle views of a simplified mechanism illustrating the operation of the tang-orienting mechanism shown in FIGS. 5, 6a, and 6b.
Figure 7B:
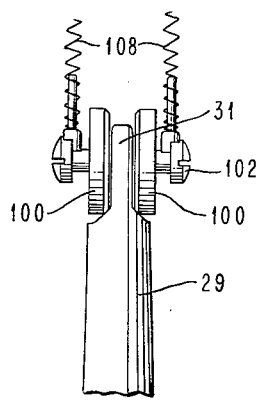

As is to be expected in the majority of situations, the tool 2 will not reside in the storage rack 14 (FIG. 1) in such a position that the tang will be in alignment with the slotted opening between the wheels 100 when socket member 25 is lowered over the shank of the tool during the first part of the chucking operation. When some degree of misalignment is present, the downward motion of the machine spindle brings the lower portion of the tang-orienting wheels into contact with the upper surface of the tang of the misaligned tool, as shown in FIG. 7a. Continued downward movement forces the wheels upward against the bias of springs 108. This upward movement causes the wheels to rotate in opposite directions through the action of camming studs 104 in camming grooves 96 and 97. The opposite rotation of the wheels tends to rotate tang 31 about the vertical axis of the tool, turning the tool in the storage rack until the tang is aligned with the space between the wheels 100. When this occurs, the force of the springs 108 urges the tang-orienting wheels downward on either side of the tang, thus seating the tang in positive interlock, as shown in FIG. 7b.

Control Device

As previously described, the prefered embodiment of the present tool changer comprises two main assemblies: a center shaft assembly, and an outer movable assembly, the latter comprising control device 17, spacer ring 19, thrust bearings 21 and tool disengaging member 23. The tool disengaging member 23 has only axial freedom relative to the center shaft, whereas the control device possesses both axial and angular freedom of movement about the center shaft. The control device with its two degrees of freedom is of prime importance in the automatic tool ejection operation of the present tool changer, as will be hereinafter described with reference to FIGS. 4 and 8. The basic housing of the control device 17 comprises the circular body portion 33 and the cover plate 39, which is secured to body 33 by means of four cap screws 87 threaded in the holes 61. Two circular openings, one in cover plate 39 at 55 and one in body member 33 at 57, act as bearing surfaces for the rotatable and axially slidable suspension of control device 17 about the threaded shaft extension 11a. An upper portion of cover plate 39 is pressed against shaft collar 63 by the spring 27, thereby establishing a maximum upward position of control device 17 relative to the center shaft. Referring to FIG. 8, body 33 has a radial groove 35 which houses two slidable weights 37 and 38 and two slidable half-nuts 45 and 46. Weight 38 is attached to half-nut 46 by means of a rod 67 and a pair of retaining rings 68a and 68b. This provides a positive connection whereby weight 38 draws half-nut 46 toward center shaft 11 when it (weight 38) slides radially outward. By means of a similar connection involving rod 65 and retaining ring 66a and 66b, half-nut 45 is drawn to the left toward shaft 11 when weight 37 moves radially outward. Two springs 69 force half-nuts 45 and 46 apart so that, in the normal condition, the half-nuts reside against two stops 59 in a maximum outward position away from shaft 11.

Following is a description of the coaction between the various elements of the control device and between the control device and the various other parts of the tool changer whereby a tool may be automatically ejected from the tool changer socket 25. Rotation of control device 17 causes the weights 37 and 38 to be centrifugally thrown radially outward in the groove 35. This action forces half-nuts 45 and 46 to close upon shaft extension 11a (FIG. 4) in opposition to the bias of springs 69. This closure causes the internal threads of the half-nuts to seat about the external threads of shaft extension 11a. This condition will be sustained as long as the centrifugal force applied to weights 37 and 38 is sufficient to overcome the bias of the springs 69.

When the half-nut and center shaft threads are thus mated, relative counterclockwise angular movement of control device 17 about the center shaft will cause the control device 17 to screw downward upon the left-hand threads of shaft extension 11a. Relative clockwise angular movement of control device 17 about the center shaft will not produce axial movement of the control device 17 because the latter mechanism is already in its maximum upward position on the center shaft. Therefore, downward axial movement of control device 17 in relation to the center shaft is produced when the former mechanism rotates in a counterclockwise direction relative to the center shaft. When control device 17 moves axially downward, spacer ring 19 is forced downward against thrust bearing 21 which, in turn, thrusts disengaging device 23 downward against the bias of spring 27. As a result, extension 10a' of pin 10a (FIG. 3) is brought into contact with the top of a tool tang residing between the inner faces of tang-orienting wheels 100. In this manner, the shank of the tool is dislodged from its position in recess 71 of socket 25 and the tool is released from the tool changer.

Tool ejection, then, may be accomplished when there is counterclockwise rotation of control device 17 relative to the center shaft. Four sets of conditions set up this type of rotation: (1) when the center shaft is accelerated in a clockwise direction while control device 17 is at rest; (2) when the center shaft is accelerated in the clockwise direction while control device 17 is also rotating in a clockwise direction; (3) when the center shaft is decelerated from a state of counterclockwise rotation while control device 17 is also rotating in the counterclockwise direction; and (4) when the center shaft is accelerated in the clockwise direction while the control device is rotating in a counterclockwise direction. Relative motion between the center shaft and the control device is set up due to the inertial "lag" of the rotatably mounted control device. In other words, because there is no positive connection between control device 17 and the center shaft, changes in the angular velocity of the latter are not immediately transferred to the former.

*Detent Mechanism*

It is apparent that tool ejection is not desirable under all of the four conditions cited above. Since it is customary to design tool bits, such as drills, reamers, etc., to perform their respective machining operations while rotating in the clockwise direction, a novel detent mechanism is provided in the preferred embodiment of the present tool changer to prevent the possibility of tool ejection under the first two of the above conditions. Tool ejection would be undesirable under the first condition because this condition occurs when the machine spindle is brought up to machining speed to perform a machining operation after a tool bit has been chucked in the socket member of the tool changer. The second condition occurs when the machine spindle is accelerated to a new speed to perform a second operation with the same tool bit—also a clearly undesirable time for tool ejection. The detent mechanism will be hereinafter described with reference to FIGS. 8 and 9.

FIG. 9 shows a plan view of the detent mechanism. The detent mechanism is mounted on the surface of cover plate 39. Two hooks 88 and 89 are secured flat against cover plate 39 by the same four cap screws 87 that secure cover plate 39 to body portion 33. Two slidable latches 79 and 80 are mounted between hooks 88 and 89 and are capable of sliding on the surface of cover plate 39 in two rectangularly related directions. Two pins 75 (FIG. 8) are mounted on weight 37 and extend vertically upward through two slots 77 in the cover plate 39. The pins 75 move in the slots 77 in accordance with the radial movement of weight 37 in groove 35. Latch 79 is mounted on the pins 75 by means of a slot 81 which runs transverse to the slots 77. Two retainers 91 on pins 75 keep latch 79 from leaving the surface of cover plate 39. A friction shoe 82 is attached to an inner portion of latch 79 by two cap screws 85. Right-hand latch 80 is connected to weight 38 (FIG. 8) by two pins 76 and is identical in all respects to the latch 79 just described. The centrifugal action of weights 37 and 38 moves latches 79 and 80, respectively, away from center shaft 11. When there is little or no centrifugal force being applied to weights 37 and 38, the action of compression springs 69 forces the latches 79 and 80 to their maximum inner position so that friction shoes 82 and 83 press against a friction ring 86 on shaft collar 63. In this condition, any relative motion between center shaft 11 and control device 17 frictionally forces latches 79 and 80 either toward or away from hooks 88 and 89, respectively, depending upon the direction of the relative rotation.

The detent mechanism prevents tool ejection in the following manner: the tool changer does not rotate during the intial tool pickup operation, as previously described under the section dealing with the tang-orienting mechanism, so that, at the beginning of the tool changing operation, no centrifugal force is applied to the weights 37 and 38 and the friction shoes 82 and 83 are in contact with friction ring 86. As soon as center shaft 11 is accelerated in the clockwise direction to bring the tool up to speed for a machining operation, control device 17, in resisting a change of momentum, momentarily lags behind the center shaft 11 in respect to speed of rotation, thereby producing counterclockwise relative rotation of control device 17 about the center shaft 11. This relative rotation causes latch 79 to be frictionally moved towards hook 88 and latch 80 to be frictionally moved towards hook 89. This latter action engages the slot 79a with finger 88a and slot 80a with finger 89a, thereby preventing the weights 37 and 38 from radial outward movement. This in turn prevents engagement of the threaded half-nuts 45 and 46 with the threaded center shaft extension 11a and effectively disables the tool ejection mechanism. There is sufficient play between the slots 79a and 80a and the fingers 88a and 89a, respectively, to allow weights 37 and 38 to fly radially outward just enough to pull friction shoes 82 and 83 away from contact with friction ring 86. Because of this, the weights 37 and 38 will maintain their latched condition as long as the rate of rotation of control device 17 is sufficient to overcome the bias of springs 69 and keep friction shoes 82 and 83 away from contact with friction ring 86. Under this condition, subsequent acceleration of the center shaft 11 can have no effect on the tool ejection mechanism of the tool changer.

In the preferred embodiment of the present invention, tool ejection is allowed to take place either under the third or fourth above-mentioned sets of conditions.

Unlatching of the detent mechanism must first take place before the tool can be ejected. The detent mechanism is unlatched in the following manner:

Rotation of the machine spindle is stopped and either kept at rest or accelerated in the counterclockwise direction. Control device 17 will continue rotating in the clockwise direction for a short time owing to its angular momentum. As the clockwise rotation of the control device coasts to zero, the centifugal force applied to weights 37 and 38 reduces to zero and the springs 69 move the latches 79 and 80 radially inward toward friction ring 86. Just before rotation of the control device ceases altogether, friction shoes 82 and 83 come into contact with friction ring 86. When this happens, and just before rotation of the control device completely stops, slots 79a and 80a are frictionally disengaged from fingers 88a and 89a, respectively, by the action of friction ring 86 on friction shoes 82 and 83. Control device 17 is then rotated in the counterclockwise direction by center shaft 11 in preparation for the tool ejection operation, which has been previously described under the section entitled "Control Device."

Tool Changer Operation

The overall operation of the device of the present invention may be most clearly described with general reference to FIG. 4. After a selected tool is positioned beneath the automatic tool changer, in alignment with the vertical axis thereof, the spindle of the machine moves downward without rotation, causing the tang and shank of the tool to enter recess 71 in the lower socket portion 25 of the automatic tool changer. The tang of the tool contacts the tang-orienting wheels 100 and is aligned and positively locked therebetween by the action of camming studs 104 in camming grooves 96 and 97 and by the springs 108. Downward movement of the machine spindle is arrested when the tapered shank 29 of the tool becomes seated in the tapered recess 71 of the socket.

The machine spindle is next raised in order to draw the tool out of its storage rack and to allow the positioning of a workpiece beneath the tool. As the machine spindle is accelerated to a machining speed in the clockwise direction, the detent mechanism latches the weights 37 and 38 and keeps them at an inner radial position within control device 17 so that the possibility of tool ejection during a machining operation is eliminated.

Upon completion of the machining operation, the machine spindle is raised and the storage rack corresponding to the tool then in use is positioned in vertical alignment beneath the tool changer. The machine spindle is first stopped and then brought to a substantial rate of rotation in the counterclockwise direction. In response to this action, latches 79 and 80 of the detent mechanism are disengaged from hooks 88 and 89 by the coaction of friction ring 86 with friction shoes 82 and 83. The rotating tool is lowered partially into the empty tool storage rack. The unlatched weights 37 and 38 move radially outward in response to the centrifugal force of rotation of the control device 17, thus drawing the threaded half-nuts 45 and 46 into engagement with the threads of shaft extension 11a. The machine spindle is now abruptly stopped and the angular momentum of control device 17 causes it, through the engagement of the half-nuts with the center, to screw downward upon the center shaft and to force the disengaging member 23 sharply downward against the bias of spring 27. The extension 10a' of pin 10a mounted in disengaging member 23 is thus brought sharply downward against the tang of the tool with sufficient force to dislodge the shank of the tool from the tapered recess 71 of socket shaft 25. Hence, the tool falls back into its storage rack and the cycle of operation of the tool changer is completed.

Summary

As is evident from the foregoing description, the preferred embodiment of the present invention provides, in a unique manner, automatic tool changing capacity to a machine tool having a rotating spindle. The socket fixture in combination with the novel tang-orienting mechanism enables the tool changer to pick up any tool having a tapered shank. Thus, standard taper-shank tools, such as, for instance, Morse taper-shank tools, may be used with the present invention and require no alternation or modification whatsoever. Further, removal of a tool from the tool changer is accomplished by spindle movements alone due to novel utilization, by the control device, of forces generated by changes in speed and direction of spindle rotation. This efficient utilization of forces permits the tool changing operations per se to be controlled by a single control unit, i.e., machine spindle control unit, and limits required accessory hardware to one relatively simple and compact device instead of several large, complicated accessory machines.

While the invention has been particularly shown and described with reference to a preferred embodiment thereof, it will be understood by those skilled in the art that various changes in form and detail may be made therein without departing from the spirit and scope of the invention.

I claim:

1. An automatic tool changer for a machine spindle rotatable in a drive and a contra-drive direction, comprising:

shaft means adapted to engage the end of the machine spindle and to rotate positively therewith;

socket means mounted on said shaft means for receiving and holding the shank of a tool;

control means rotatably mounted about said shaft means for providing relative angular motion therebetween in response to a change in angular velocity of said shaft means;

camming means between said control means and said shaft means for converting the relative angular motion therebetween into linear motion of said control means directed along the axis of rotation of said shaft means;

tool disengaging means mounted about said shaft means in juxtaposition to said tool shank and movable axially of said shaft means in response to said linear motion of said control means, for dislodging said tool shank from said socket means; and means for preventing operation of said camming means during angular acceleration of said shaft means in the drive direction.

2. An automatic tool changer for a machine spindle having driving means capable of driving the spindle in forward or reverse direction or of stopping the spindle, comprising:

socket means including a chuck portion adapted to receive and hold the shank of a tool and an attachment portion for rigidly securing said socket means to the machine spindle;

control means mounted on said socket means so as to be movable angularly and axially in relation to said socket means;

means limiting axial motion of said control means on said socket means in one direction;

resilient means urging said control means against said limiting means;

normally ineffective cam means including elements on said socket means and on said control means, respectively, said elements on said control means being movable in response to centrifugal force, when said control means rotates, to change said cam means to an effective state; said elements on said socket means and on said control means being adapted, when said cam means is in said effective state, to coact in response to relative rotation of said control means and said socket means in one direction, to drive said control means axially away from said limiting means; and tool knock-out means adapted to be operated by said control means when it executes said last mentioned axial movement, to eject a tool from the chuck portion of said socket means.

3. An automatic tool changer for a machine spindle having driving means capable of driving the spindle in forward or reverse direction or of stopping the spindle, comprising:
- socket means including a chuck portion adapted to receive and hold the shank of a tool and an attachment portion for rigidly securing said socket means to the machine spindle;
- control means mounted on said socket means so as to be movable angularly and axially in relation to said socket means;
- means limiting axial motion of said control means on said socket means in one direction;
- resilient means urging said control means against said limiting means;
- weight means included in said control means, said weight means being movable, in response to centrifugal force when said control means rotates, in a direction radially outward from said socket means;
- normally ineffective cam means including elements on said socket means and on said weight means, respectively, said elements on said weight means being adapted to move in conjunction with said weight means to change said cam means to an effective state; said elements on said socket means and on said weight means being adapted when said cam means is in said effective state to coact in response to relative rotation of said control means and said socket means in one direction, to drive said control means axially away from said limiting means; and
- tool knock-out means adapted to be operated by said control means when it executes said last-mentioned axial movement, to eject a tool from the chuck portion of said socket means.

4. An automatic tool changer for a machine spindle having driving means capable of driving the spindle in forward or reverse direction or of stopping the spindle, comprising:
- socket means including a chuck portion adapted to receive and hold the shank of a tool and an attachment portion for rigidly securing said socket means to the machine spindle;
- control means mounted on said socket means so as to be movable angularly and axially in relation to said socket means;
- means limiting axial motion of said control means on said socket means in one direction;
- resilient means urging said control means against said limiting means;
- weight means included in said control means, said weight means being movable, in response to centrifugal force when said control means rotates, in a direction radially outward from said socket means;
- normally disengaged cam means including screw threads on said socket means and movable half-nuts connected to said weight means, said half-nuts being adapted to engage with said screw threads, thereby engaging said cam means, in conjunction with said radial outward movement of said weight means; said cam means being adapted to respond, when engaged, to relative rotation of said socket means and said control means in one direction to drive said control means axially away from said limiting means; and
- tool knock-out means adapted to be operated by said control means when it executes said last-mentioned axial movement, to eject a tool from the chuck portion of said socket means.

5. An automatic tool changer for a machine spindle having driving means capable of extending or retracting the spindle or of driving it in forward or reverse directions or of stopping the spindle, said spindle also having a plurality of tool racks selectively positionable in an operative position relative thereto, said tool changer comprising:
- socket means including a chuck portion adapted to receive and hold the shank of a tool and an attachment portion for rigidly securing said socket means to the spindle, said chuck portion including a recess capable of frictionally holding the tapered shank of a tool after being brought into contact therewith by relative movement of the spindle and the tool, said tool being initially supported in an operative position relative to the spindle by one of the plurality of tool racks;
- locking means for preventing relative rotation of the tool shank and said socket means when the shank is held in said chuck recess, said locking means having a slotted opening wherein the tang of the tool resides in a positive angular interlock with said socket means;
- first cam means for angularly orienting the tang so as to prepare the latter for entrance into said slotted opening, said first cam means being actuated by said relative movement of the spindle and the tool;
- control means mounted on said socket means so as to be movable angularly and axially in relation to said socket means;
- means limiting axial motion of said control means on said socket means in one direction;
- resilient means urging said control means against said limiting means;
- normally ineffective second cam means including elements on said socket means and on said control means, respectively, said elements on said control means being movable in response to centrifugal force, when said control means rotates, to change said second cam means to an effective state; said elements on said socket means and on said control means being adapted, when said second cam means is in said effective state, to coact in response to relative rotation of said control means and said socket means in one direction, to drive said control means axially away from said limiting means; and
- tool knock-out means adapted to be operated by said control means when it executes said last-mentioned axial movement, to eject a tool from the chuck portion of said socket means.

6. An automatic tool coupler for a machine spindle having driving means capable of extending or retracting the spindle, said spindle also having a plurality of tool racks selectively positionable in an operative position relative thereto, said tool coupler comprising:
- socket means including a chuck portion adapted to receive and hold the shank of a tool and an attachment portion for rigidly securing said socket means to the spindle, said chuck portion including a recess capable of frictionally holding the tapered shank of a tool after being brought into contact therewith by relative movement of the spindle and the tool, said tool being initially supported in an operative position relative to the spindle by one of the plurality of tool racks;
- locking means for preventing relative rotation of the tool shank and said socket means when the shank is held in said chuck recess, said locking means having a slotted opening wherein the tang of the tool resides in a positive angular interlock with said socket means; and
- cam means for angularly orienting the tang so as to prepare the latter for entrance into said slotted opening, said cam means being actuated by said relative movement of the spindle and the tool.

7. An automatic tool coupler for a machine spindle having driving means capable of extending or retracting the spindle, said spindle also having a plurality of tool racks selectively positionable in an operative positions relative thereto, said tool coupler comprising:
- socket means including a chuck portion adpated to receive and hold the shank of a tool and an attachment portion for rigidly securing said socket means to the spindle, said chuck portion including a recess capable of frictionally holding the tapered shank of a tool after being brought into contact therewith by relative movement of the spindle and the tool, said tool being initially supported in an operative position relative to the spindle by one of the plurality of tool racks;

locking means for preventing relative rotation of the tool shank and said socket means when the shank is held in said chuck recess, said locking means having a slotted opening wherein the tang of the tool resides in a positive angular interlock with said socket means; and cam means including a pair of rotatable disks and a pair of camming studs attached one on each of said disks, respectively, said camming studs being capable, when acted upon by said relative motion of the spindle and the tool, of rotating said pair of disks in opposite directions for angularly orienting the tang so as to prepare the latter for entrance into said slotted opening.

No references cited.